United States Patent [19]

Kuo et al.

[11] Patent Number: 5,754,762
[45] Date of Patent: May 19, 1998

[54] SECURE MULTIPLE APPLICATION IC CARD USING INTERRUPT INSTRUCTION ISSUED BY OPERATING SYSTEM OR APPLICATION PROGRAM TO CONTROL OPERATION FLAG THAT DETERMINES THE OPERATIONAL MODE OF BI-MODAL CPU

[76] Inventors: Chih-Cheng Kuo; Minwen Lo, both of 7 Maidens Bower Ct., Potomac, Md. 20854

[21] Appl. No.: 782,063

[22] Filed: Jan. 13, 1997

[51] Int. Cl.⁶ .............................. G06F 9/46; G06F 12/14
[52] U.S. Cl. .................... 395/186; 395/490; 395/734; 395/800.43; 380/4
[58] Field of Search .................. 395/186, 187.01, 395/188.01, 378, 570, 580, 566, 733, 734, 741, 490, 491, 868, 885, 800.36, 800.37, 800.38, 800.42, 800.43; 380/4, 50, 23, 24, 25; 235/490

[56] References Cited

U.S. PATENT DOCUMENTS

| | | | |
|---|---|---|---|
| 4,827,512 | 5/1989 | Hirokawa et al. | 380/23 |
| 5,014,312 | 5/1991 | Lisimague et al. | 385/25 |
| 5,131,091 | 7/1992 | Mizuta | 395/186 |
| 5,168,151 | 12/1992 | Nara | 235/490 |
| 5,202,923 | 4/1993 | Kuriyama | 380/50 |
| 5,274,817 | 12/1993 | Stahl | 395/580 |
| 5,293,577 | 3/1994 | Hueske et al. | 380/25 |
| 5,335,331 | 8/1994 | Murao et al. | 395/570 |
| 5,430,852 | 7/1995 | Watanabe et al. | 395/580 |
| 5,452,431 | 9/1995 | Bournas | 395/490 |
| 5,471,045 | 11/1995 | Geronimi | 235/492 |
| 5,500,949 | 3/1996 | Saito | 395/427 |
| 5,542,081 | 7/1996 | Geronimi | 395/800.37 |
| 5,557,743 | 9/1996 | Pombo et al. | 395/186 |
| 5,559,989 | 9/1996 | Sourgen et al. | 395/490 |
| 5,590,312 | 12/1996 | Marisetty | 395/800 |
| 5,600,818 | 2/1997 | Weikmann | 395/490 |
| 5,615,263 | 3/1997 | Takahashi | 380/4 |
| 5,615,381 | 3/1997 | Iijima | 395/490 |

*Primary Examiner*—Meng-Ai T. An
*Attorney, Agent, or Firm*—Peter Gibson

[57] ABSTRACT

Multiple applications upon an IC microprocessor are protected with bi-modal CPU operation, either in application mode or system mode, using an operation flag determining the mode and a functional interrupt with each mode change. Direct subroutine calling is replaced by a software interrupt which clears all working memory and registers except those holding parameters including the return address placed in stack. Access authorization utilizing a comparison register containing application and system memory boundaries according to the particular custom command utilized is associated with a mode change interrupt in application initialization. System subroutine running involves two mode change interrupts, from application to system and back, and includes access authorization. Request of an address beyond the territory assigned to the custom command utilized results in a hardware interrupt which clears all working memory and registers in the system mode and except that necessary to forward a status word indicating abnormal termination. Application completion forwards the result with a status word indicating successful completion. Hard-wired bi-modal CPU operation utilizing a mode change interrupt which saves parameters in stack but clears all other registers and working memory and utilizes a comparison register to authorize the system address prior to return to application mode with the return address held in stack ensures that operation in the application authorized by the custom command utilized will result either in successful completion or abnormal termination without possible access of any other application contained upon the IC card.

20 Claims, 4 Drawing Sheets

FIG 3

1. Custom command entered with external interface device.
2. Command recognized in system mode as corresponding to one particular application.
3. Verify access condition in the system mode.
4. Request in system mode for application program.
   a. Place requested address placed in a register;
   b. Place parameters in registers/working memory;
   c. Set program and data memory boundaries for this application in a comparison register;
   d. Clear all registers and working memory not used in a - c.
5. Mode change interrupt.
   a. Place return address in stack;
   b. Place original operation flag (system mode) in stack;
   c. Change operation flag to application mode.
6. Process custom command.
   a. Software interrupt service routine: execute application program with the address placed in the register by step (4.a);
   b. Place result in registers and/or working memory;
   c. Clear all registers/working memory not used in previous step (6.b).
7. Return from interrupt
   a. Restore operation flag to system mode;
   b. Return to system with stacked return address.
8. Forward result to external interface device.

FIG 4

1. Request made in application mode for system subroutine.
    a. Place requested address in a register;
    b. Place parameters in registers and/or working memory;
    c. Clear all registers and working memory not used in substeps (a & b).
2. Mode change interrupt.
    a. Place return address in stack;
    b. Place original operation flag (application mode) in stack;
    c. Change operation flag to system mode.
3. Verify access condition.
4. Process system subroutine.
    a. Place result in registers and/or working memory;
    b. Clear all registers and working memory not used in previous step.
5. Return from interrupt.
    a. Restore operation flag from stack;
    b. Return address taken from stack.

FIG 5

1. Invalid access attempt recognized by comparison register.
2. Hardware interrupt generated.
3. Process hardware interrupt service routine.
    a. Return Error message of status work to external interface device;
    b. Reset CPU;
    c. Clear all registers and working memory.

SECURE MULTIPLE APPLICATION IC CARD USING INTERRUPT INSTRUCTION ISSUED BY OPERATING SYSTEM OR APPLICATION PROGRAM TO CONTROL OPERATION FLAG THAT DETERMINES THE OPERATIONAL MODE OF BI-MODAL CPU

BACKGROUND OF THE INVENTION

1. Field of the Invention

The present invention relates generally to 'smart cards' containing integrated circuit (IC) microprocessors, more particularly to operating systems for such intended to enable multiple applications and most specifically to such systems intended to enable access to particular applications by use of a selected 'custom' command while denying access to any of the other applications encompassed.

2. General Background

The use of IC microprocessors embedded in a plastic card similar dimensionally to conventional credit cards, which are characterized by the capability of magnetically storing information, has more recently emerged as a valuable product for facilitating financial services primarily. Cards with an IC microprocessor embedded inside and with external contacts for communication with an interface device are known commonly as smart cards or IC cards. The microprocessor utilized possesses the ability to hold an operating program and other information in volatile memory alterable by a CPU (Central Processing Unit) which possesses 'hard-wired' control circuitry. The CPU and the various types of memory together comprising the microprocessor may all be contained by a single IC 'chip'.

Smart cards possess the capability of modifying data stored in memory in response to communication with an interface device. Smart cards also, in contrast to conventional cards which store information magnetically, require an electrical energy supply which is typically provided by an external interface device. In order to safeguard against unauthorized use of a smart card a 'custom command' or code, created or selected by the owner, is required to access the operating program. This practice is considered to resemble closely that utilized to prevent unauthorized use of conventional ATM (Automatic Teller Machine) access cards wherein a numeric code is entered into an ATM after the magnetically stored information on the card is read by the machine in order to verify authorized access.

ATMs dispense paper currency and deduct a corresponding amount from a financial account held by the user, and also make information available regarding financial accounts, typically by printing the information requested upon a slip of paper dispensed from the machine. Other, more sophisticated, ATMs are known which enable transactions between accounts and which provide information upon a display screen, for example, however, a record of any information, including that for any transaction conducted with the machine, cannot be made upon a conventional ATM card while such records can be created and maintained within a smart card.

Current smart card technology includes the capability of multiple application use and the ability to enter into non-volatile memory a custom command chosen by the user. However, these cards either have a fixed operating system which does not include the ability to enter into non-volatile memory any custom command or the custom commands are public to all applications. Current smart card hardware design does not ensure restriction of each custom command to a particular application. Any application may be accessed by any custom command. furthermore, each custom command may bypass security control and dump or otherwise alter all volatile memory upon the card.

3. Discussion of the Prior Art

In lieu of prior art which enables protected multiple application use of a single microprocessor wherein each application can only be accessed with a particular custom command, it is considered that the most pertinent prior art available is concerned with multiple programs upon a single microprocessor and the restrictions necessary to prevent unauthorized access of programs. First the capability of altering a program held in an IC is considered.

U.S. Pat. No. 4,542,453 issued to Patrick et al. discloses use of a "single-chip microcomputer device" containing ROM (read only memory) for storage of a program which may be altered. An external "memory device containing one bit for each potential ROM address" has the ROM addresses for the program "applied". "(E)ach bit is set to mark the beginning address of code to be patched" which is done with an interrupt "signalled when one of these set bits is accessed by an address occurring during operation". (Abstract)

This ability to alter the program held by a single chip 'microcomputer', which is considered equivalent to a single IC microprocessor, effected by an external device in the disclosure discussed above, is, in a manner, developed, in the innovation disclosed by U.S. Pat. No. 4,802,119 issued to Heene et al. for a 'Single Chip Microcomputer with Patching and Configuration Controlled by On-Board Non-Volatile Memory'. The non-volatile memory is contrasted to electrically erasable programmable read-only memory (EEPROM) and is considered equivalent to the hard-wired control circuitry of the CPU in terminology utilized herein.

Other types of erasable memory (EPROM) are also known in the art and the type of memory with which the disclosure made by Heene et al. is concerned is termed mask read-only memory (mask ROM). The term mask, it is explained, refers to the masking of the chip during manufacture by which this memory is 'programmed' at the factory. Because "(s)ingle-chip MCUs nearly always include some mask ROM," "typically used to contain critical interrupt and reset vectors and, in the case of custom MCUs, customer-supplied programs" (Col. 1, lines 23–26) it was considered desirable to reconfigure this mask memory with non-volatile memory on the chip in order to rectify manufacturing mistakes, effect 'up-grades' or otherwise avoid having to replace the entire chip when a change in the mask ROM is desired.

The capability of modifying memory held in mask ROM is related to the objective of obtaining multiple programs upon a single IC chip each accessed with a custom code in that the encryption logic of the operating system is typically held in mask ROM and the addition of programs to an single IC microprocessor is recognized as requiring additional encryption which might be achieved by altering some mask ROM. U.S. Pat. No. 4,827,512, issued to Hirokawa et al. considers that "(i)n the conventional IC card, the function program is stored in a program memory comprising a mask ROM in or outside the control element. For this reason, if the function program for decrypting data is stored in the IC card, the encrypting method cannot be modified." (Col. 1, lines 25–29) It is further considered therein that use of multiple CPUs for multiple operating programs is impractical and that "(t)herefore, strong demand has arisen for a technique for storing and executing a new function program in addition to the already stored function program." (Col. 1, lines 35–37)

This disclosure of Hirokawa et al. divides a memory area into system and a user program areas, utilizes a flag in the command or response text associated with text transmission between the IC card and an external "host system" to indicate whether text is written in the system or user program memory area. This divided memory area has a "conversion table for function code and the start address of a program corresponding to the function code" which is used as a parameter to obtain the start address of the corresponding program and facilitates loading of the function program to be added. "The memory area (also) has a correspondence table between a newly added function code and the start address of an added function program" so that "(t)he added function program (may be) selectively executed." (Abstract)

The disclosure made by U.S. Pat. No. 5,542,081 issued to Geronimi for an 'IC Card Designed to Receive Multiple Programs in a Programmable Memory' is considered to represent another step in the development represented by the references discussed above. The entire system is described as "a microprocessor-based chip card that provides several different functions at different hierarchical levels." In this disclosure "filtering instructions" contained in ROM read "filter addresses" within specified EEPROM memory zones. The EEPROM is "capable of containing not only data but also a code that can be executed by the microprocessor." The filter instructions read filter addresses and "(d)epending on the contents of this (filter) zone the program will be routed, or not routed, towards the (code) zones . . . (t)hus information is recorded at only one address of the EEPROM in order to control accessibility to the different functions of the circuit. " (Abstract)

It is understood from this synopsis given in the Abstract of this reference in combination with a reading of the Background of the Invention that access to each zone in EEPROM containing programs is dependent upon the filter address read and that the filtering instructions governing which such address is read is altered at different stages, first by the manufacturer of the IC, then by the IC card manufacturer, then by an institution providing the financial or other services the card facilitates, "and the final user . . . will finally be able to use a fourth level of functions." (Col. 1, lines 26–29) This is the only example presented in this reference of "several different functions that are accessible to different levels of use." (Col. 1, lines 31–32)

It is considered that the concern for security in selectively executing or accessing separate programs contained within a single IC microprocessor is related to the ability to alter various types of memory within the IC. Given the ability to alter mask ROM as disclosed by Heene et al. combined with the ability to add a new function program as disclosed by Hirokawa et al., which is specifically predicated upon the inability to readily alter mask ROM, it is considered that what is known herein as hard-wired control circuitry for the CPU may be determinative of whether mask ROM is alterable or not and what portions may or may not be altered.

4. Statement of Need

The review of the prior art above indicates that the control circuitry of a single IC microprocessor is determinative of enabling access to various types and zones of memory held by the IC. Access to and the ability to alter ROM may be restricted to an external device, additional programs may be added and different programs may be selectively accessible at various levels as determined by altered states of ROM. However, other than by utilizing a custom code recognized as authorizing access at a given level, there is no known system in the prior art for protecting access to multiple applications.

Hence it is considered that a need therefore exists for an IC operating system possessing a control circuitry which will provide security to separate multiple applications all contained upon a single IC microprocessor such as that contained in a smart card and also provide selective, protected, access to a plurality of such applications from at a given level of use.

SUMMARY OF THE INVENTION

Objects of the Invention

The encompassing object of the present invention is the provision of a system for secure multiple application operation upon a single integrated circuit microprocessor upon a single integrated circuit microprocessor intended for use embedded in a plastic card and possessing external contact for communication with an external interface device wherein each application can define a corresponding custom command and the application provider can download any particular custom command corresponding to a particular application into the IC card. Any attempt to access the memory outside the boundaries defined for the application triggers a hardware interrupt to stop the command in order to protect the security of the card. Under application mode, a direct addressing subroutine call outside the memory boundaries defined for the particular application program utilized, including the system subroutine and custom commands corresponding to other applications, triggers generation of a hardware interrupt terminating the custom command. the system subroutine call is replaced by a mode change interrupt which provides control of the card operating system to provide the security of the application provider defined custom commands.

An auxiliary object of the present invention is the provision of a system for secure multiple application operation upon a single integrated circuit microprocessor wherein each custom command under one application is allowed to access the program memory within that application, each custom command under one application is allowed to access the data file(s) only after a system subroutine verifies the access condition, each custom command under one application being allowed access only to the working memory granted by the operating system.

Principles Relating to the Present Invention

A smart card containing an IC controlled by an embodiment in accordance with the principles relating to the present invention allows the user to enter into non-volatile memory a plurality of custom commands, each particular to a different application program held therein, sufficient to gain access to one such application program only and unable to access other application data files or custom commands.

A system for secure multiple application operation upon a single integrated circuit microprocessor has unalterable 'hard-wired' control circuitry for the central processing unit of the microprocessor which uses an interrupt dependent flag to effect bi-modal operation between an application program mode and system mode. The change of operation mode from application to system is effected with a mode change interrupt function wherein all the working memory and all registers except that holding parameters to be used in the system mode are cleared.

System program, subroutine or data calling from the application mode is effected by such a mode change interrupt wherein the address of the system portion requested is authorized prior return to the application mode by the use of a comparison register in which the boundaries of territory authorized as accessible with the custom command utilized in application initialization are defined by address. Return to application mode uses a return address in stack. Because it is desirable to terminate in the system mode, it is considered preferable to authorize access to a system address in the system mode, after the interrupt effecting the mode change, but prior to return to the application. The change of operation mode from system to application is effected with an interrupt function wherein all working memory and registers except that holding parameters to be used in the application mode are cleared in association with return to the address in stack.

Operation is commenced with the recognition by the CPU in the system mode of a custom command dedicated to a particular application program. Prior to utilization of a custom command, the operating system sets memory boundaries in a comparison register which defines a territory authorized as accessible by the particular custom command. Access of the application program is effected in application initialization with a mode change interrupt which parses the parameters to be used in the application mode, including the application program address which is put into stack, and clears all registers except for these parameters.

If the portion of memory territory requested in a call for any system or application program, subroutine, or data retrieval does not lie within the boundaries corresponding to the custom command utilized in application initialization a hardware interrupt is generated in which all working memory and registers are cleared and operation is terminated. A status word which yields an error code upon an associated external interface device may be forwarded as a parameter with clearing of all other registers. Upon application completion operation terminated by return from an interrupt which further generates a status word indicating successful completion and conveying the execution result in registers and/or working memory with clearing of all other registers and working memory.

Operation in the application mode invariably ends with return to the system mode effected by a mode change interrupt clearing all working memory and registers except that used to forward a status word indicating successful completion and the execution result readable by an external interface device in the case of application completion or indicating abnormal termination with an error code readable by an external interface device in the case of an unauthorized access request or other condition resulting in an invalid access interrupt.

Use of an IC microprocessor possessing this system for the control circuitry of the same embedded in a card and further possessing external contacts for communication with an external interface device is a preferred use for an embodiment of the principles relating to the present invention. Therefore, the generation of the status word in the cases of abnormal termination and successful application completion facilitate the generation of, respectively, an error code or indication of successful execution with the execution result in communication with an external interface device. These capabilities are considered additionally optional to the hardware mode change interrupt which terminates operation and clears all working memory except that holding parameters necessary for forwarding the appropriate system status.

Other considerations which are within the ability of one practiced in the art but which will clearly set forth what is considered the best manner of making and using the preferred embodiments of the principles relating to the present invention set forth above may be readily comprehended with a reading of the detailed discussion following with reference to the drawings attached hereto and described briefly immediately below.

BRIEF DESCRIPTION OF THE DRAWINGS

FIG. 3 is an outline depicting a preferred sequence for application program initialization.

FIG. 4 is an outline depicting a preferred sequence for running a system subroutine from application mode.

FIG. 5 is an outline depicting a preferred sequence for abnormal termination of operation.

DETAILED DESCRIPTION OF THE PREFERRED EMBODIMENTS

A preferred embodiment of the principles in accordance with the principles of the present invention is intended for use as governing the control logic of a microprocessor contained within a single IC embedded within a card possessing external contacts for communication with an external interface device. At present, the number, dimensions, locations and functions of the contacts upon "Identification cards—Integrated circuit(s) cards with contacts—" is defined by ISO 7816 which first defines integrated circuit(s) as "Electronic component(s) designed to perform processing and/or memory functions" and an IC card as possessing "one or more integrated circuits". A minimum contact surface area is defined in part 2 by a rectangle measuring 2.0×1.7 mm each of which is located within a range defined in relation to the top left corner of the card face defining two columns of four contacts each, eight total, as seen in FIG. 1.

Figure 1:
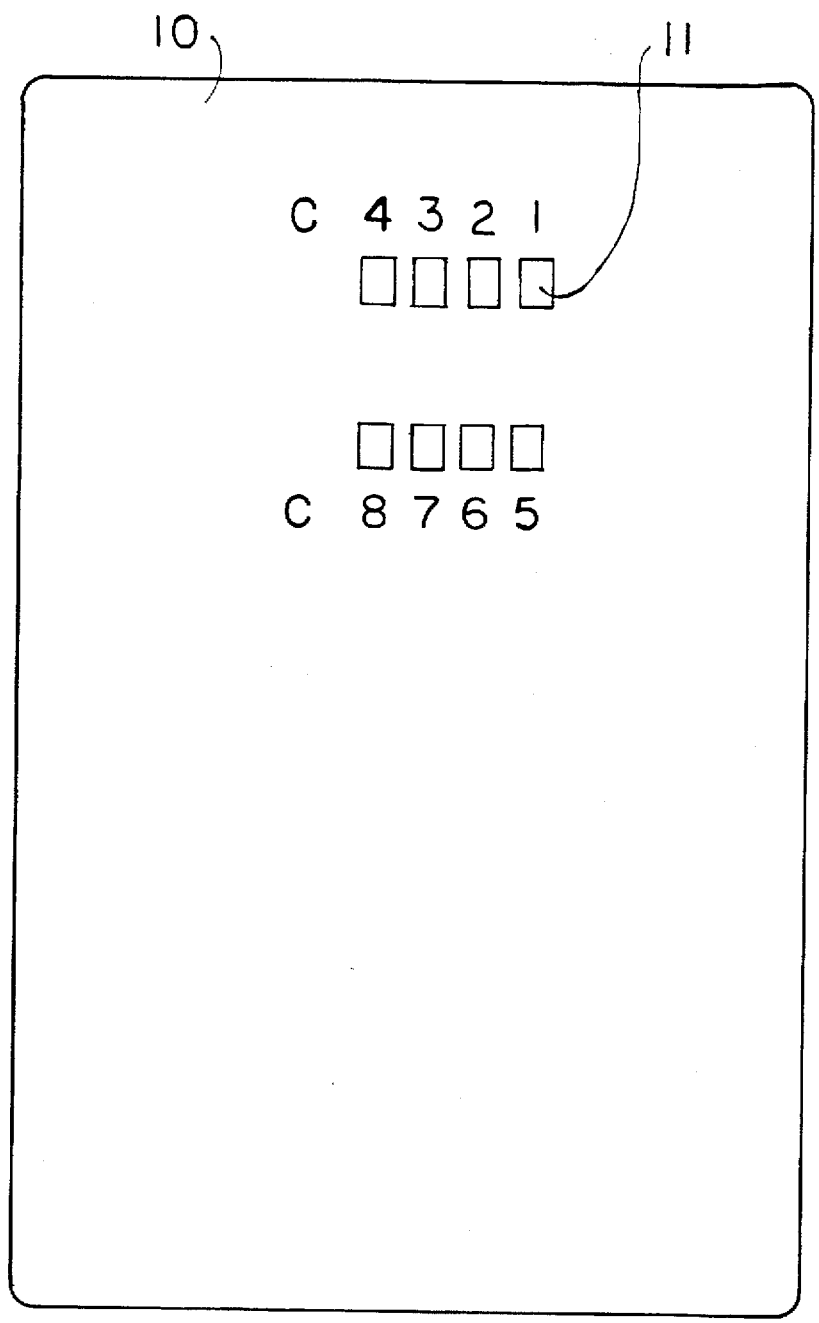
FIG. 1 is an isometric view of a plastic 'smart card' possessing external contacts for communication with an external interface device.

ISO 7816 Part 2 further identifies the contacts 11 as C1 through C8, also represented in FIG. 1 upon an IC card 10, and the function assigned to each:

| | |
|---|---|
| C1: VCC (Supply voltage); | C5: GND (Ground) |
| C2: RST (Reset signal); | C6: VPP (Programming voltage) |
| C3: CLK (Clock signal); | C7: I/O (Data input/output) |
| C4: reserved for future use; | C8: reserved for future use. |

ISO 7816 Part 3 describes the protocols for electronic signals and transmissions, including parameter construction, for IC cards.

These cards are identification cards intended for information exchange negociated (sic) between the outside and the integrated circuit in the card.

As a result of an information exchange, the card delivers information (computation results, stored data), and/or modifies its content (data storage, event memorization). (ISO/IEC 7816-3: Introduction; 1989, (E))

It is further noted in the succeeding paragraph that "(d)uring the preparation of this International Standard . . . (r)elevant patents were identified in France and USA, (with) the patent holder being Bull S. A. in each case."

Among the other protocol descriptions set forth in ISO/IEC 7816-3, the structure and processing of commands is described in §8.2: "A command is always initiated by the interface device. It tells the card what to do in a 5-byte header, and allows a transfer of data bytes under control of procedure bytes sent by the card." A command header comprised of five successive bytes designated CLA, INS, P1, P2, P3 is defined in subsection 8.2.1. The first two bytes are the instruction class and code, the remaining three are parameters. P1 and P2 are described as "a reference (e.g. an address) completing the instruction code" while P3 codes the number n of data bytes ($D_1 \ldots D_n$) which are to be transmitted during the command. " The structure of this command header provides what is known herein as command syntax.

With regard to what is known herein as response syntax for signal transmission by the card to an interface device ISO 7816-3 states that "Three types of procedure bytes are specified:" acknowledge bytes or ACK upon which depends interface control of data exchange and of VPP state; NULL bytes which restarts the work waiting time and anticipates a subsequent procedure byte; and status bytes, SW1 which ensures VPP is idle for receipt "of an SW2 byte to complete the command . . . At each procedure byte, the card can proceed with the command by an ACK or NULL byte, or . . . conclude by an end sequence SW1-SW2." (ISO/IEC 7816-3 §8.2.2) The meaning of SW1 is defined as independent of the application "(w)hen the most significant half byte of SW1 is '6' . . . five values are defined:

| | |
|---|---|
| '6F' | The card does not support the instruction class. |
| '6D' | The instruction code is not programmed or is invalid. |
| '6B' | The reference is incorrect. |
| '67' | The length is incorrect. |
| '6F' | No precise diagnosis is given. |

Other values are reserved for future use by ISO/IEC JTC1/SC17. (ISO/IEC 7816-3 §8.2.2)

It is further stated that neither '9X' SW1 bytes, nor SW2 bytes are interpreted; "their meaning relates to the application itself."

SW1-SW2 is known herein as a status word which either indicates successful completion, with the execution result, or indicates abnormal termination in an error code such as one of the five values defined above, both status words being readable by the interface device and preferably in accordance with current ISO standards regarding signal and transmission protocols. It is further understood that the operation of a control system in accordance with the principles relating to the present invention is preferably consistent with current ISO or equivalent standards.

Figure 2:
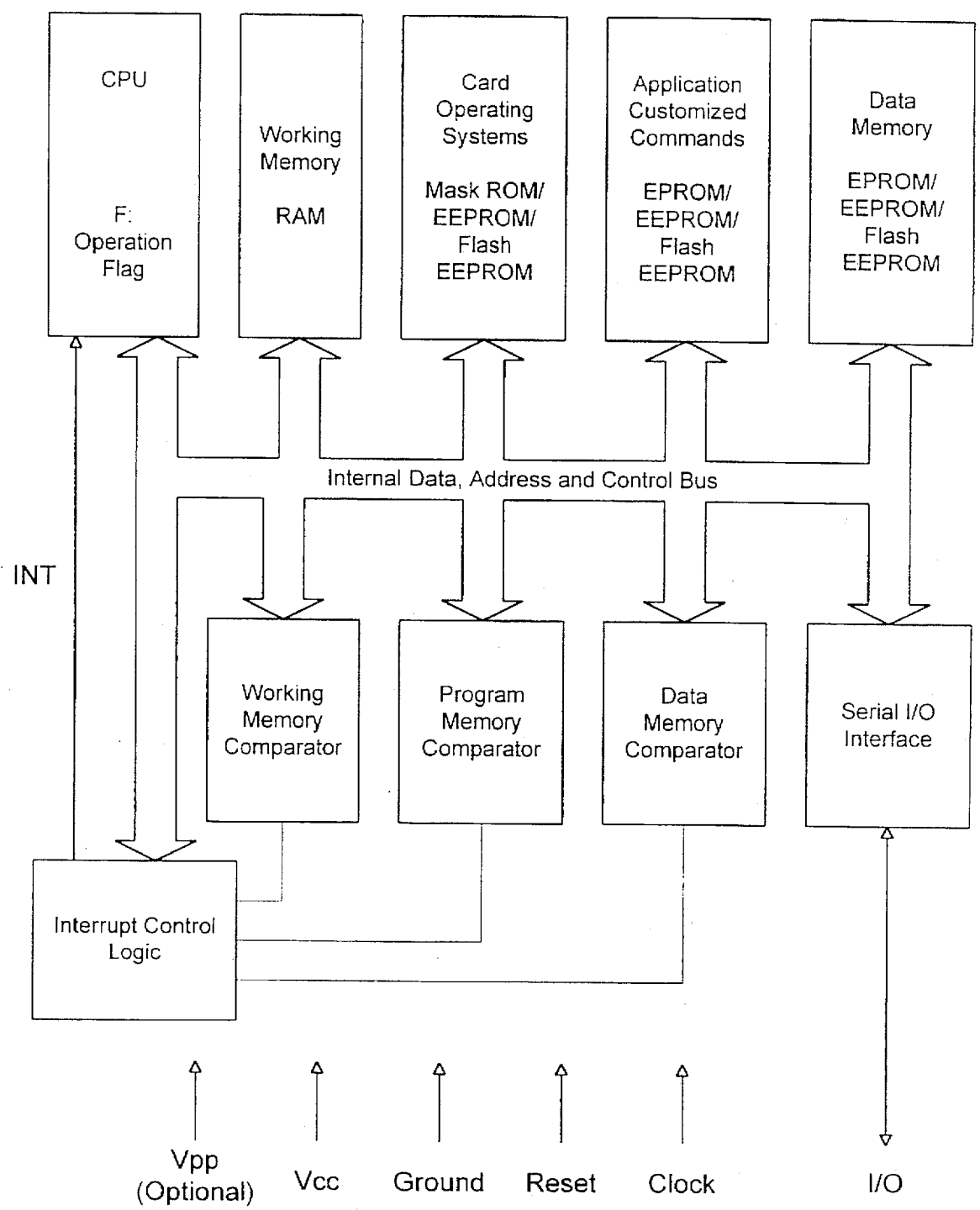
FIG. 2 is an outline depicting a preferred secure multiple application IC card configuration.

FIG. 2 depicts the secure multiple Application IC card configuration. By adding the operation flag and comparison registers into the traditional microprocessor, provision is made for the security of each custom command supplied by the application provider when the IC card is utilized in conjunction with an external interface device which places the microprocessor in the IC card into communication with the application provider such as system run by a banking institution.

The logic governing a control system in accordance with the principles relating to the present invention may be described in sequential manner, as depicted in FIGS. 3-5, however, many of the steps depicted are necessarily associated, i.e. must occur together, though one may precede the other without significant effect. The two cannot actually be simultaneous, but, in being necessarily associated, the functional effect is similar to simultaneity. This relation holds between certain steps internal to a mode change interrupt wherein parameters including the return address and the operation flag are (1) put into stack; all other registers and working memory being (2) cleared. Although it may be preferred to place the required parameters in stack prior to clearing the other registers, the steps may readily be reversed since the register holding the required parameters is distinct from the others.

In addition, the address requested must be (3) authorized with use of a comparison register in the case of an interrupt effecting access of system memory, data, subroutine or program. If system memory is requested from application mode with an interrupt which includes the return address of the application, this third step, authorization, may be conducted in association with either interrupt. However, it is desirable to conduct authorization in the system mode because the comparison register is preferably accessible only within system mode. Therefore, the preferred sequence involving these steps is interrupt from application to system mode with return address in stack and authorization of the address in system mode prior return to application mode. Authorization may also be conducted before or after a system subroutine is run. Therefore, the order of certain steps comprising a preferred sequence may be varied.

With reference to FIG. 3, the sequence of the substep (4.a) and (4.b) in the fourth step have to match the sequence of the substep (7.a) and (7.b) in the seventh step. It is also preferred to move substep (4.d) to be the first substep in step four and clear all registers and working memory. Some time in processing may be lost in clearing some of the registers and/or working memory and update in substeps (4.a, b & c), but some time in processing may be saved in utilizing a block memory fill. The substep(4.c) can be placed in any sequence combination within step 4. The initialization represented assumes an interface device for entrance of a valid custom command corresponding to one particular application and recognized by the microprocessor in the system mode. If the custom command is not recognized as valid, the operating system will send an error message in the status word and terminate the command. Recognition of the custom command as valid, using the comparison register in the system mode (step 4.c) triggers the interrupt (step 5).

FIG. 4 depicts the preferred sequence replacing system subroutine calling from application mode. Five major steps (1-5) are recognized each, except step 3, possessing at least two substeps (a, b, c). Step I is followed by a first mode change interrupt depicted in step 2. This mode change interrupt has three associated steps (a) through (c) which must occur together but which may be performed in any desired sequence since the registers into which the required parameters are stored are distinct from the working memory which is cleared. With regard to step 4, the substeps (a) and (b) may be reversed. The difference between a register and working memory is considered to be that existing between CPU memory and RAM.

Data held in a register are accessed much more quickly than data stored in RAM. For this reason it is preferred that the result parsed be placed into a register, however, sufficient register memory space may be lacking and RAM required. In this case it is necessary to clear all working memory in the subsequent return from mode change interrupt in substep (4.b) except that utilized for storage of the result. It is assumed in the sequence outlined in FIG. 4 that sufficient register space exists for the requested address (1.a) and the necessary parameters (1.b). This may not be the case and working memory may be required for this if register space is insufficient. Clearing of all working memory (1.c) in this case would make an exception for that memory holding either the requested address or necessary parameters as required.

It is, however, considered preferable to avoid use of working memory for parameter and address storage prior completion of the mode change interrupt because of the loss of speed and because it is simpler to assure that all memory which is not necessary for the following step is cleared prior system operation. With the return address of the application program placed in stack and all working memory cleared during the mode change interrupt of the sequence, it is only necessary to maintain the registers holding the necessary parameters and clear all the working RAM other than the result once the result is obtained. This is considered to provide a relatively simple and therefore preferred manner of implementation. If RAM is required prior to the first mode change interrupt for the requested address, this memory may similarly be cleared in step (4.b) in which case it may be considered preferable to verify acess authorization (step 3) before running of the subroutine or parsing the result.

A preferred sequence for this is depicted in FIG. 5 which comprises just two major steps, recognition of the invalid access attempt (1) and a hardware interrupt which resets the CPU and clears all working memory and registers after forwarding of an error message to the external interface device.

It is emphasized that the foregoing is intended to set forth what is considered the best manner of effecting an embodiment in accordance with the principles relating to the present invention and is unrestrictive in any manner whatsoever either of the scope of the invention or the corresponding property secured by Letters Patent for which I hereby claim:

1. A control system for a microprocessor, intended for use within an IC card that supporting multiple applications, each said application is associated with a particular custom command, said control system comprising:

bi-modal CPU operation means, changing operation modes between system mode and application mode; the operation modes of said bi-modal CPU operation means being determined by an operation flag, wherein the changing of the operation flag is dependent upon an interrupt instruction function; issued by an operating system, an interrupt instruction function effecting a mode change from system mode to application mode places a return address for system mode and an original operation flag for system mode in stack, and clears all registers and working memory unnecessary for the next step in the application mode; wherein a mode change interrupt instruction function from application mode to system mode restores the operation flag placed in stack for system mode, returns to system with the stacked system address, and clears all working memory and all registers except that holding parameters to be used in said system mode;

application initialization means for initializing in system mode, said initializing including verification of a utilized custom command and setting of memory boundaries in a comparison register as corresponding to a particular application program given authorized access;

verification means for verifying authorized access to both system and application memories requested by the application program given authorized access using said interrupt function, whereby said comparison register corresponding to the particular application program set with the application initialization means is utilized to verify authorized access to the memory requested prior to return to the application program with the requested memory; wherein any invalid access attempt results in abnormal termination of operation, which effects a hardware interrupt that causes all working memory and all registers which are not required for forwarding of an error signal to be cleared;

wherein said verification means ensure that only memory verified as having authorized access is accessible from a particular application held in said IC card, said application initialization means having ensured said particular application as corresponding to a valid custom command, which together with said bi-modal CPU operation means dependent upon an operation flag changed by said mode change interrupt function associated with clearing of all working memory and all registers unnecessary in the next mode, ensure that comparison registers can not be accessed by any application, thereby securing each of the multiple applications upon an IC card.

2. A control system in accordance with claim 1, wherein said application initialization means first recognizes the custom command in said system mode as corresponding to one of the multiple applications and then proceeds through said mode change interrupt function effecting a change in mode from said system mode to application mode wherein the address of the application recognized and necessary parameters are placed in registers, all registers and the working memory which are not used are cleared, the operation flag is changed and the application program is accessed from the register with the return address of the system mode placed in stack.

3. The control system of claim 1, wherein said mode change interrupt instruction function is generated by software utilizing a software interrupt instruction.

4. The control system in accordance with claim 3, wherein said mode change interrupt instruction function from said system mode to said application mode is different than said mode change interrupt instruction function from said application mode to said system mode.

5. The control system in accordance with claim 3, wherein said mode change interrupt instruction function from said system mode to said application mode, and said mode change interrupt instruction function from said application mode to said system mode utilize the same instruction but a different indicator in a parameter.

6. The control system of claim 1, wherein the hardware interrupt is disabled during execution of said mode change interrupt, said hardware interrupt being enabled immediately after the mode change interrupt instruction.

7. The control system of claim 1, wherein the hardware interrupt is disabled during execution of a return from said mode change interrupt, said hardware interrupt being enabled immediately after return from a completed mode change interrupt instruction.

8. The control system of claim 1, wherein said comparison registers are inaccessible by application program, the CPU generating said hardware interrupt when an attempt to modify said comparison register is made under said application mode.

9. The control system of claim 1, wherein said comparison registers contain upper bounds and lower bounds of authorized memory access.

10. The control system of claim 1, wherein said comparison registers are comprised of three types: program memory comparison registers, data memory comparison registers, and working memory comparison registers.

11. The control system of claim 1, wherein a request for a system subroutine in said application mode triggers said mode change interrupt function in which the requested address is placed in a register, parameters necessary for said system mode are placed in registers, and working memory if desired due to insufficient register space, the registers and working memory not utilized are cleared, the original operation flag is saved, and the return address of the application program is placed, in stack, and operation flag is changed.

12. The control system of claim 1, wherein a request for a system subroutine in said application mode triggers said mode change interrupt function followed by verification of access authorization including the steps of accessing the subroutine requested, running said subroutine, and placing the result into registers and into working memory if desired due to insufficient register space.

13. The control system of claim 1, wherein a request for a system subroutine in application mode triggers said mode change interrupt function to allowed by verification of access authorization which is further followed by a return from mode change interrupt in which all said registers and working memory which are not necessary for forwarding the result, operation flag is restored with the stacked operation flag and return to the application program is effected with the stacked return address.

14. The control system of claim 1, wherein said abnormal termination includes the steps of recognizing an invalid access attempt with said comparison register, in which said application boundaries are set, generating a hardware interrupt function and processing a hardware interrupt service routine including return of an error message in a status word to an external interface device and resetting of the CPU effecting clearing of all said registers and working memory.

15. The control system of claim 1, wherein successful application completion is followed by placing the result in said registers and working memory, clearing of unnecessary registers and all working memory, returning from mode change interrupt to said system mode and forwarding to an external interface device the result placed in a register in a status word.

16. The control system of claim 1, wherein any said custom command required by more than one of said application programs may be saved in a root level so that only one copy of code corresponding to each custom command is necessary and memory space upon the microprocessor contained within the IC card thereby conserved.

17. The control system of claim 1, wherein said comparison register is comprised of a table of indexes which point to a list of memory blocks which indicate authorized access, and for which a request which is not present of the list results in a generation of a hardware interrupt terminating operation.

18. The control system of claim 1, wherein a request for a block of said working memory required by the application program must be made by the operating system in order to prevent said hardware interrupt triggered by attempted access of said working memory beyond the boundaries contained in a pertinent comparison register.

19. The control system of claim 18, wherein release of the working memory requested is made prior to application program completion.

20. The control system of claim 18, wherein said release of requested working memory prior to application program completion is ensured by a garbage collection function.

* * * * *